US011406182B1

(12) United States Patent
Stoddard

(10) Patent No.: US 11,406,182 B1
(45) Date of Patent: Aug. 9, 2022

(54) PET SLEEPING PLATFORM

(71) Applicant: Patti Jean Stoddard, Tower, MN (US)

(72) Inventor: Patti Jean Stoddard, Tower, MN (US)

(*) Notice: Subject to any disclaimer, the term of this patent is extended or adjusted under 35 U.S.C. 154(b) by 435 days.

(21) Appl. No.: 16/591,986

(22) Filed: Oct. 3, 2019

Related U.S. Application Data

(60) Provisional application No. 62/743,198, filed on Oct. 9, 2018.

(51) Int. Cl.
*A47B 23/04* (2006.01)
*A47D 9/00* (2006.01)
*A01K 1/035* (2006.01)
*A47C 19/20* (2006.01)

(52) U.S. Cl.
CPC .............. *A47B 23/04* (2013.01); *A01K 1/035* (2013.01); *A47C 19/20* (2013.01); *A47D 9/00* (2013.01)

(58) Field of Classification Search
CPC ....... A47B 23/04; A47B 23/02; A47B 23/025; A47B 2023/048; A01K 1/035; A47D 9/00
USPC ....................................................... 119/28.5
See application file for complete search history.

(56) References Cited

U.S. PATENT DOCUMENTS

| | | |
|---|---|---|
| 317,709 A | 5/1885 | Blake |
| 549,820 A | 11/1895 | Pursell |
| 560,979 A | 5/1896 | Doughty |
| 595,930 A | 12/1897 | Willis |
| 812,099 A | 2/1906 | Taylor |
| 814,538 A | 3/1906 | Grigsby |
| 1,431,299 A | 10/1922 | Godsell |
| 1,442,157 A | 1/1923 | Korp |
| 1,598,569 A * | 8/1926 | Fitzhugh ................ A47B 23/02 5/310 |
| 2,212,488 A * | 8/1940 | Bell ........................ A47B 9/00 108/147 |
| 2,252,215 A * | 8/1941 | Stearns .................. A47B 23/04 108/4 |
| 2,406,447 A | 8/1946 | Waters |
| 2,483,920 A * | 10/1949 | McLean ................ A47B 23/02 5/507.1 |
| 4,178,926 A * | 12/1979 | Cohn .................... A61F 5/3769 5/513 |
| 4,286,525 A * | 9/1981 | Willmore ............... A47B 23/04 108/143 |
| 5,161,484 A | 11/1992 | Duane |
| 6,047,422 A | 4/2000 | Yousif |

(Continued)

FOREIGN PATENT DOCUMENTS

GB 486979 A * 2/1937
GB 806960 A * 2/1956

OTHER PUBLICATIONS https://www.amazon.com/Overbed-Computer-Hospital-Bedroom-Adjustable/dp/B07GKQCS4Y, pp. 1-7, dated Oct. 3, 2019.

*Primary Examiner* — Brady W Frazier
*Assistant Examiner* — Zoe Tam Tran
(74) *Attorney, Agent, or Firm* — Hamre, Schumann, Mueller & Larson, P.C.

(57) ABSTRACT

An over-the-bed pet platform is configured to be disposed at the foot end of the bed, and extend cross-wise across the width of the bed, and above the bed, with opposite support legs of the pet platform resting on the floor. The support legs are releasably attached to the bed frame using bed frame attachment member. A sleep structure is disposed on the upper side of the platform that can accommodate one or more pets or a child.

18 Claims, 5 Drawing Sheets

(56) References Cited

U.S. PATENT DOCUMENTS

| | | | | |
|---|---|---|---|---|
| 6,134,731 | A | * | 10/2000 | Thom .................... A61G 7/053 5/426 |
| 6,588,366 | B1 | | 7/2003 | Ranson |
| 6,810,820 | B1 | * | 11/2004 | Okerlund ................. A47B 9/06 108/50.01 |
| 6,854,402 | B2 | * | 2/2005 | DuBarry ................ A47B 45/00 108/146 |
| 6,862,757 | B2 | | 3/2005 | Andriunas |
| 6,968,810 | B2 | | 11/2005 | Bishop |
| 7,584,514 | B1 | * | 9/2009 | Salas ........................ A47D 7/04 5/95 |
| 7,886,693 | B1 | | 2/2011 | Salzman |
| 7,987,538 | B1 | * | 8/2011 | Kimball ................. A61G 7/053 5/426 |
| 8,230,818 | B2 | | 7/2012 | Pietra |
| 8,381,333 | B2 | | 2/2013 | Friedman |
| 9,615,539 | B2 | | 4/2017 | Rutledge |
| 2001/0035486 | A1 | * | 11/2001 | Pryor ................... A47B 23/025 248/447.2 |
| 2004/0078895 | A1 | | 4/2004 | Elling |
| 2006/0042548 | A1 | | 3/2006 | Tharalson |
| 2007/0006808 | A1 | * | 1/2007 | Scatchard ............ A01K 1/0353 119/28.5 |
| 2008/0115271 | A1 | * | 5/2008 | Wiley ...................... A47G 9/02 5/482 |
| 2011/0203052 | A1 | * | 8/2011 | Stephens ................ A61G 9/003 5/604 |
| 2014/0101847 | A1 | * | 4/2014 | von Rohrscheidt ..... A47D 7/04 5/95 |
| 2015/0308615 | A1 | * | 10/2015 | Neaves ................. A01K 1/035 248/124.1 |

\* cited by examiner

PET SLEEPING PLATFORM

This application claims the benefit of U.S. Provisional Application Ser. No. 62/743,198, the entire contents of which are incorporated herein by reference.

FIELD

This technical disclosure describes a pet platform that is disposed cross-wise at the foot of a bed and positioned above the bed surface to accommodate a pet and allow the pet to rest or sleep above the bed surface without interfering with a human sleeping in the bed.

BACKGROUND

One example of an over-the-bed pet bed assembly is disclosed in U.S. Pat. No. 9,615,539. The assembly in U.S. Pat. No. 9,615,539 is fixed solely to the footboard of the bed. Therefore, the stability of the assembly, and the ability of the assembly to accommodate large pets, is limited.

SUMMARY

An over-the-bed pet platform (also referred to as an over-the-bed pet bed assembly) is described. The pet platform is configured to be disposed at the foot end of the bed, and extend cross-wise across the width of the bed, and above the bed, with opposite sides of the pet platform resting on the floor.

In one embodiment described herein, a pet platform that is configured for use with a bed having a mattress supported on a bed frame includes a support frame having first and second support legs, and a support member that extends horizontally between the first and second support legs. The first and second support legs each have a base end that in use rest on a floor on which the bed is supported, an upper end that in use is positioned above a surface of the mattress, an inner side that in use faces toward the bed, and an outer side that in use faces away from the bed. The base ends of the first and second support legs are spaced apart from one another by a distance of at least thirty-eight inches which allows the pet platform to span the width of at least a twin-size bed. The support member has opposite ends that are fixed to the upper ends of the first and second support legs whereby in use the support member is positioned above a surface of the mattress. The support member further includes a lower side that in use faces toward the surface of the mattress, and an upper side that in use faces away from the surface of the mattress. At least one bed frame attachment member is secured to the first support leg, and at least one bed frame attachment member is secured to the second support leg. The bed frame attachment members are configured to releasably attach the first and second support legs, respectively, to the bed frame. In addition, the bed frame attachment member are positioned closer, for example slightly closer, to the respective base ends of the first and second support legs than they are to the respective upper ends of the first and second support legs, which permits the bed frame attachment members to be removably attached to the bed frame at the sides of the bed.

DRAWINGS

DETAILED DESCRIPTION

Figure 1:
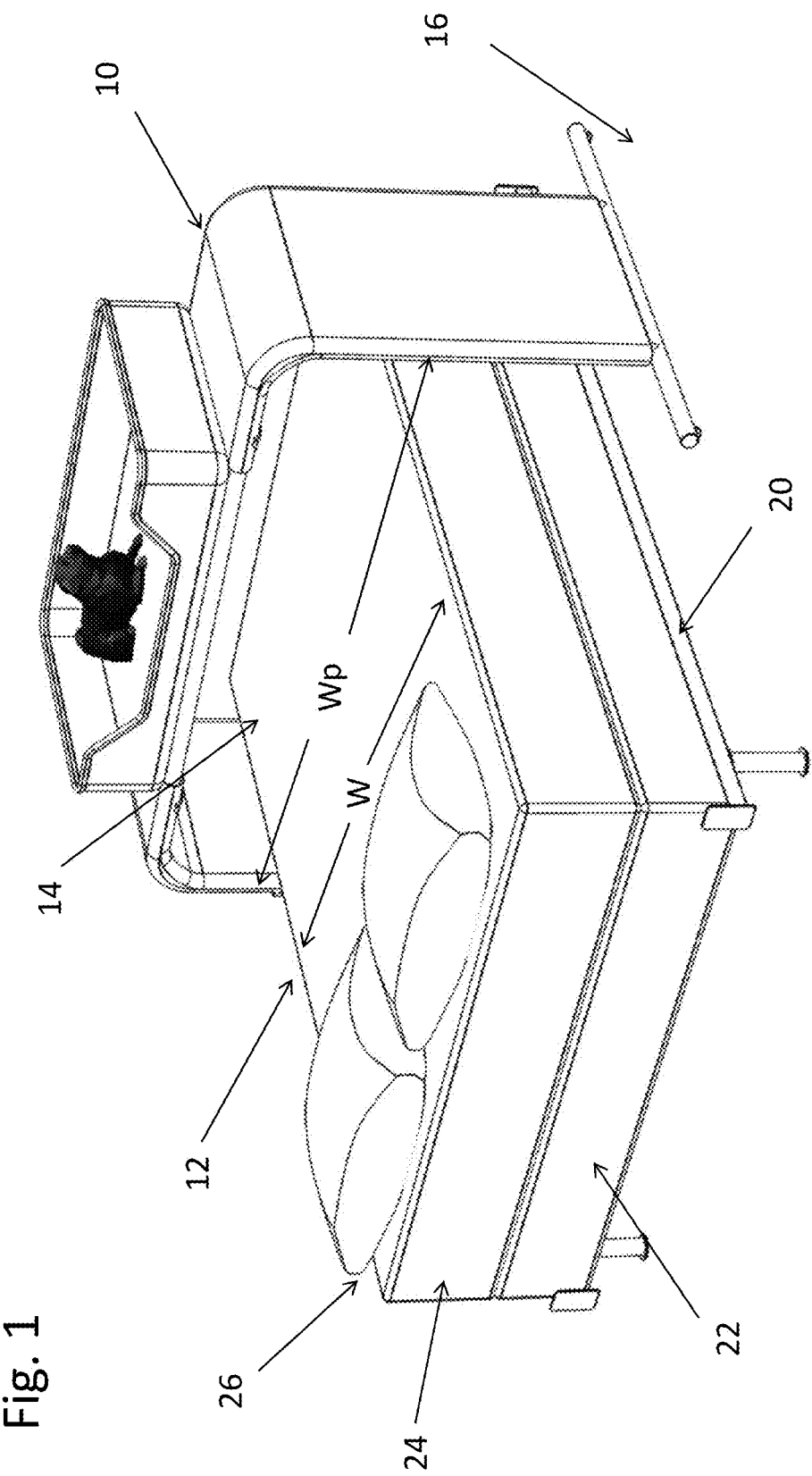
FIG. 1 is a perspective view of a pet platform described herein in position at the foot of the bed.

An embodiment of an over-the-bed pet platform 10 (also referred to as an over-the-bed pet bed assembly) described herein is illustrated in FIGS. 1-4. The pet platform 10 is configured to be disposed over a bed 12 at the foot end 14 thereof, and extend cross-wise across the width W of the bed 12, and above the bed 12, with opposite sides of the pet platform 10 resting on the floor 16 (which can be carpet, hardwood, laminate, or other type of flooring) on which the bed 12 is supported.

In the illustrated example, the bed 12 includes a bed frame 20 with at least two side rails/side boards 21 (only one side rail 21 is visible in FIG. 2) on which is supported a box spring 22 and a mattress 24. The bed 12 includes the foot end 14 and a head end 26 opposite the foot end 14. The bed 12 can have any size including, but not limited to, twin size, full size, queen size, or king size. In the case of a twin size bed, the width W is approximately 38.0 inches, with the width W increasing as the size of the bed increases. The pet platform 10 has a minimum width $W_p$ that is sufficient to span the width W of the bed 12, for example slightly greater than 38 inches, for example about 40.0 inches. The width $W_p$ that is used is sufficient to provide a gap between the bed and the support legs of the pet platform to facilitate making the bed. However, if making the bed is not a concern, then the width $W_p$ that is used can be only slightly greater than 38.0 inches. In one embodiment, the width $W_p$ can be anywhere between about 40.0 inches to about 78.0 inches.

Figure 2:
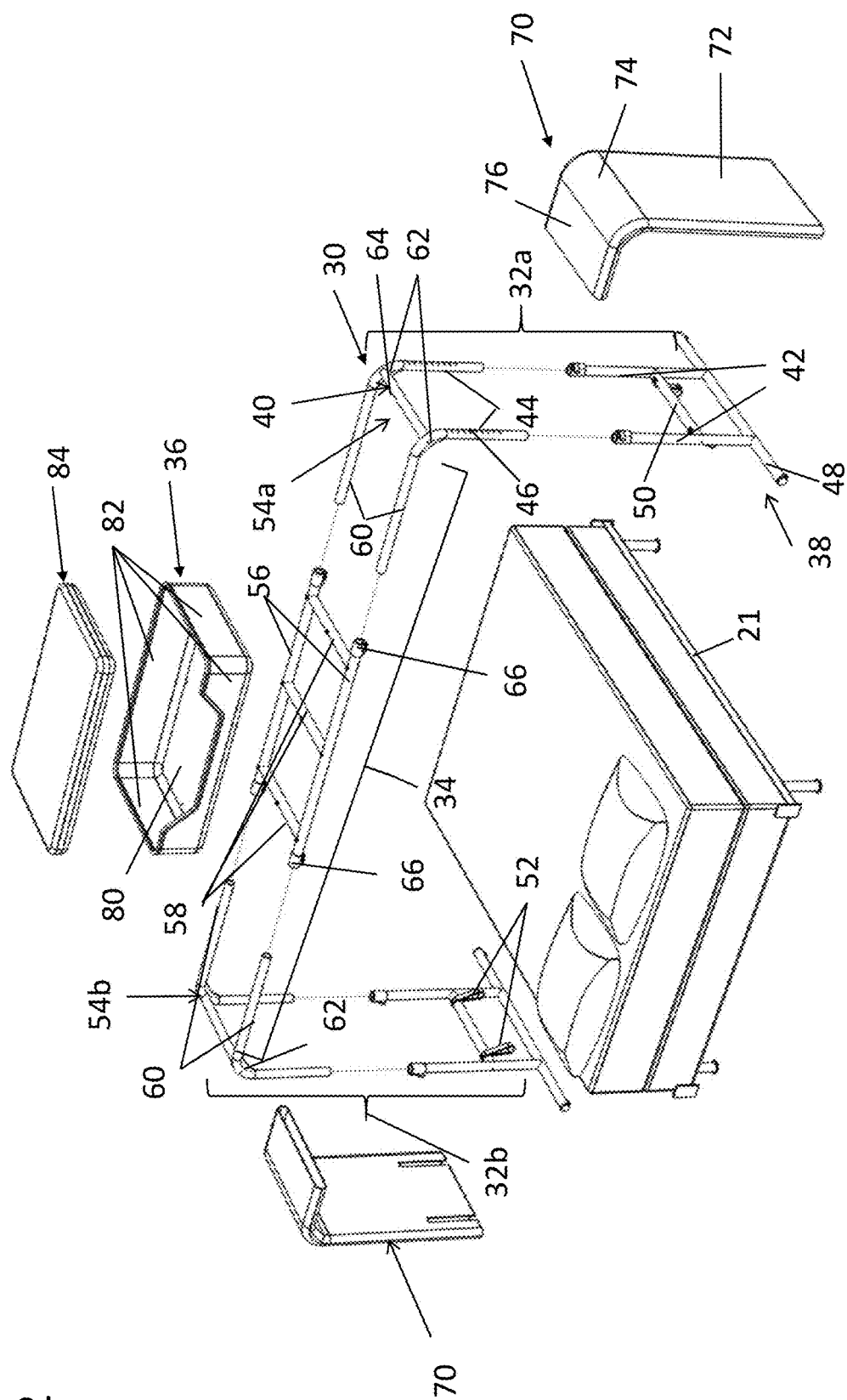
FIG. 2 is an exploded view showing the various components of the pet platform.

Referring to FIG. 2, the pet platform 10 includes a support frame 30 having first and second support legs 32a, 32b, and a support member 34 that extends horizontally between the first and second support legs 32a, 32b. The pet platform 10 further includes a bed insert 36 disposed on the support member 34 on which the pet is intended to sleep.

The support legs 32a, 32b are identical in construction and only the first support leg 32a will be described in detail, it being understood that the second support leg 32b has an identical construction. The first support leg 32a has a base end 38 that in use rest on the floor 16, an upper end 40 that in use is positioned above the top surface of the bed 12 (i.e. above the top surface of the mattress 24), an inner side that in use faces toward the bed 12, and an outer side that in use faces away from the bed 12. The first support leg 32a is configured to be adjustable in height to permit adjustments in the height of the pet platform 10.

Figure 3:
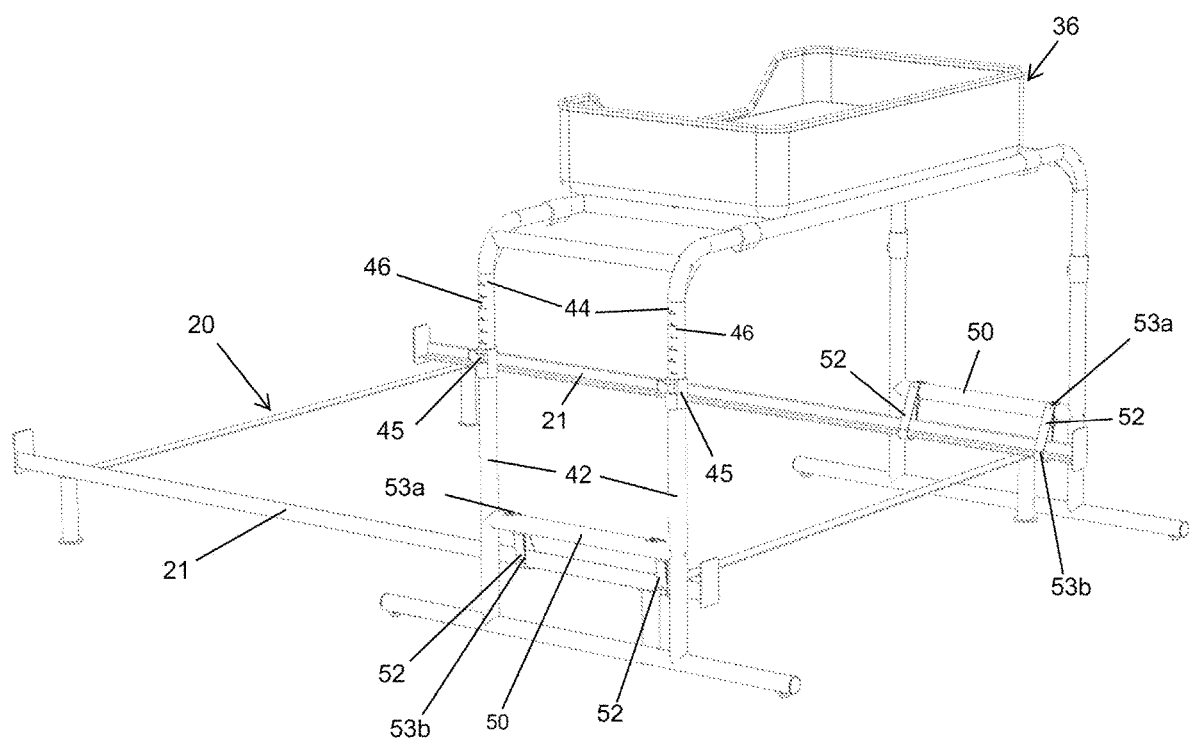
FIG. 3 is a perspective view of the bed frame and the attachment of the support frame to the bed frame.

The first support leg 32a can have any configuration that is suitable for supporting the pet platform 10, being height adjustable, and performing any other functions of the support leg 32a. In the illustrated example, the support leg 32a has a first pair of vertical hollow members 42 that are laterally spaced from each other, and a second pair of vertical members 44 that are telescoped within the vertical members 42. The vertical members 42 can include clamping collars 45 that can be unlocked to permit the vertical members 44 to be adjusted up or down (i.e. in or out) of the vertical members 44 to adjust the height of the pet platform 10, and then the clamp collars 45 can be locked to fix the positions of the vertical members 42, 44. As best seen in FIG. 3, adjustment marks 46 can be provided on the vertical member 44 which marks 46 can indicate a height of the pet platform 10. A horizontal floor support member 48 is disposed at the base ends of the vertical members 42 for supporting the first support leg 32a on the floor 16. The floor support member 48 has a length (measured between its ends) that is greater than the distance between the vertical members 42 to prevent tipping of the pet platform 10. The floor support member 48 is devoid of wheels, casters or other mechanisms that allow the floor support member 48 to roll along the floor 16. In addition, a spacer member 50 extends between the vertical members 44 at a position above the floor support member 48, and at a height, for example from the floor 16, that is greater than the height of the side rails/side boards 21 of the bed frame 20 from the floor 16.

The base ends 38 and the floor support members 48 of the first and second support legs 32a, 32b are spaced apart from one another by a distance of at least thirty-eight inches, for example at least about 40 inches, to permit the pet platform 10 to span the width of the bed 10. In addition, at least one bed frame attachment member 52 is secured to the first support leg 32a, for example to the spacer member 50. In the illustrated example, there are two of the bed frame attachment members 52 attached the spacer member 50. The bed frame attachment members 52 are configured to releasably attach the first support leg 32a to the bed frame 20. For example, the bed frame attachment members 52 can be straps that are fixed to the spacer member 50, and that are sized to be releasably secured around the bed frame 20, for example around the side rails 21 thereof. The straps can include hook and loop fasteners, buttons, snaps, or any other type of releasable connection that permit adjustable and releasable securement around the bed frame 20. Each bed frame attachment member 52 has a first end 53a fixed to the respective support leg 32a, 32b and a second end 53b formed into a loop, and the first end 53a is located vertically above the second end 53b. The bed frame attachment members 52 are positioned closer, for example slightly closer, to the base end 38 of the first support leg 32a than they are to the upper end 40 of the first support leg 32a. With reference to FIG. 3, the spacer member 50 is positioned higher than the height of the top of the side rails/side boards 21. The position of the spacer member 50 is such that fixed ends of the bed frame attachment members 52 are located a distance above the bed frame 20. This positioning of the spacer member 50 above the side rails 21 of the bed frame 20 means that when the bed frame attachment members 52 are secured to the bed frame 20, the bed frame attachment members 52 are held tight/taut and the weight of the bed 12 helps to hold the pet platform 10 down in engagement with the floor 16.

With continued reference to FIG. 2, the support member 34 has opposite ends 54a, 54b that are fixed to the upper ends 40 of the first and second support legs 32a, 32b whereby in use the support member 34 is positioned above the bed 12 (i.e. above the surface of the mattress 24). The support member 34 further includes a lower side that in use faces toward the bed 12 (i.e. toward the surface of the mattress 24), and an upper side that in use faces away from the bed (i.e. away from the surface of the mattress 24). The support member 34 should be spaced a distance above the bed to permit a person's feet to fit under the support member 34. In one embodiment, the support member 34 can be spaced above the bed 12 a distance of about 8.0 to about 12.0 inches, or a distance of about 32.0 to about 42.0 inches above the floor 16. The distance of the support member 34 above the bed 12 can be adjusted by adjusting the height of the support legs 32a, 32b. The support member 34 is configured to be adjustable in length/width to permit adjustment of the distance between the opposite ends 54a, 54b.

The support member 34 can have any configuration that is suitable for supporting the weight of the bed insert 36 and a pet sleeping thereon, permit adjustments in length/width, and performing any other functions of the support member 34. In the illustrated example, the support member 34 has a ladder-shaped central portion with a pair of spaced, hollow, horizontal members 56 and a plurality of spacers 58 between the members 56. The support member 34 further includes end members 60 that are telescoped within the horizontal members 56 at each end thereof. The end members 60 are connected to the vertical members 44 of the support legs 32a, 32b by connecting elbows 62. Spacers 64 interconnect the elbows 62 at the upper ends 40 of the support legs 32a, 32b.

The end members 60 telescoped within the horizontal members 56 permit the length/width of the support member 34 to be adjusted. For example, the horizontal members 56 can be provided with clamping collars 66 at each end that can be unlocked to permit the end members 60 to be adjusted in or out of the horizontal members 56 to adjust the length/width, and then the clamp collars 66 can be locked to fix the positions of the end members 60 and the horizontal members 56.

The support frame 30 elements, such as the vertical members 44, the horizontal floor support members 48, the spacer members 50, the horizontal members 56, the spacers 58, the end members 60, the connecting elbows 62, and the spacers 64 can be formed of a material such as plastic, aluminum, or steel.

With reference to FIGS. 1 and 2, in some embodiments, optional slip covers 70 can be provided that are configured to be removably disposed over the first and second support legs 32a, 32b. The slip covers 70 are hollow and designed to be slid over the end members 60, over the elbows 62, and then down over the support legs 32a, 32b. As shown in FIG. 2, the slip covers 70 include a vertical portion 72 that covers the support legs 32a, 32, a curved portion 74 that covers elbows 62, and a horizontal portion 76 that covers a portion of the end members 60 up to the bed insert 36. The slip covers 70, if used, help improve the aesthetics of the pet platform 10. The slip covers 70 can be provided with decorative features, sports logos, made in colors to match bedding used on the bed or to match room decor, and the like. The slip covers 70 can be formed of natural or synthetic materials, and blends thereof. Examples of materials that can be used include, but are not limited to, cotton, wool, silk, linen, hemp, nylon, rayon, and blends thereof. The slip covers 70 are sized to fit tight around the support legs 32a, 32b, and the slip covers 70 can be mechanically attached to the pet platform 10, for example to the end members 60, using any type of mechanical fasteners including, but not limited to, hook and loop fasteners, snaps, buttons and the like.

With reference to FIGS. 1 and 2, the bed insert 36 is disposed on the support member 34 at the upper side thereof. The bed insert 36 can be removably fixed to the support member 34, for example using screws, or hook and loop fasteners. The bed insert 36 includes a bottom wall 80 and a plurality of upstanding side walls 82 extending from the bottom wall 80. The side walls 82 and the bottom wall 80 define an interior space, and a cushioned sleep pad 84 is disposed within the interior space resting on the bottom wall 80. The bed insert 36 can include four of the side walls 82, three of the side walls 82 with one side (for example, the side facing the head end 26 of the bed 12) open, or three full height side walls and one partial height side wall as illustrated in FIGS. 1 and 2. The height of the side walls 82 and the size of the interior space are sufficient to define a sleep space.

Figure 4:
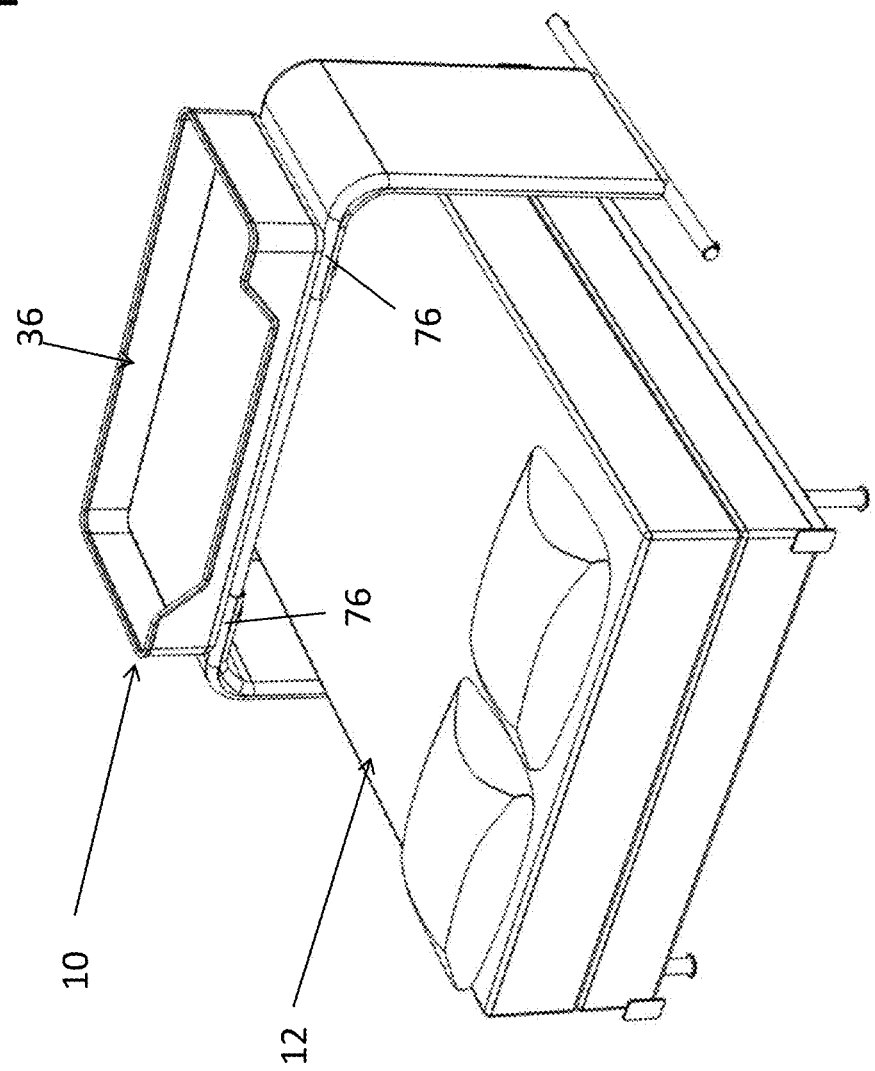
FIG. 4 illustrates a pet platform described herein sized for two pets.

The pet platform 10 and the bed insert 36 can be configured to accommodate one or more pets. Examples of pets include, but are not limited to, one or more dogs, or one or more cats. FIG. 1-2 illustrate the bed insert 36 configured in size to accommodate a single dog. FIG. 4 illustrates an embodiment where the bed insert 36 is configured in size to accommodate two dogs, and the bed insert is extended in length so that it extends over the horizontal portions 76 of the slip covers. The embodiment in FIG. 4 is otherwise identical in construction and function as the embodiment in FIGS. 1-3. In some embodiments, the platform 10 and the bed insert 36 can be configured to support a sleeping child in the bed insert 36, in which case the bed insert 36 may also be referred to as a bassinet.

Figure 5:
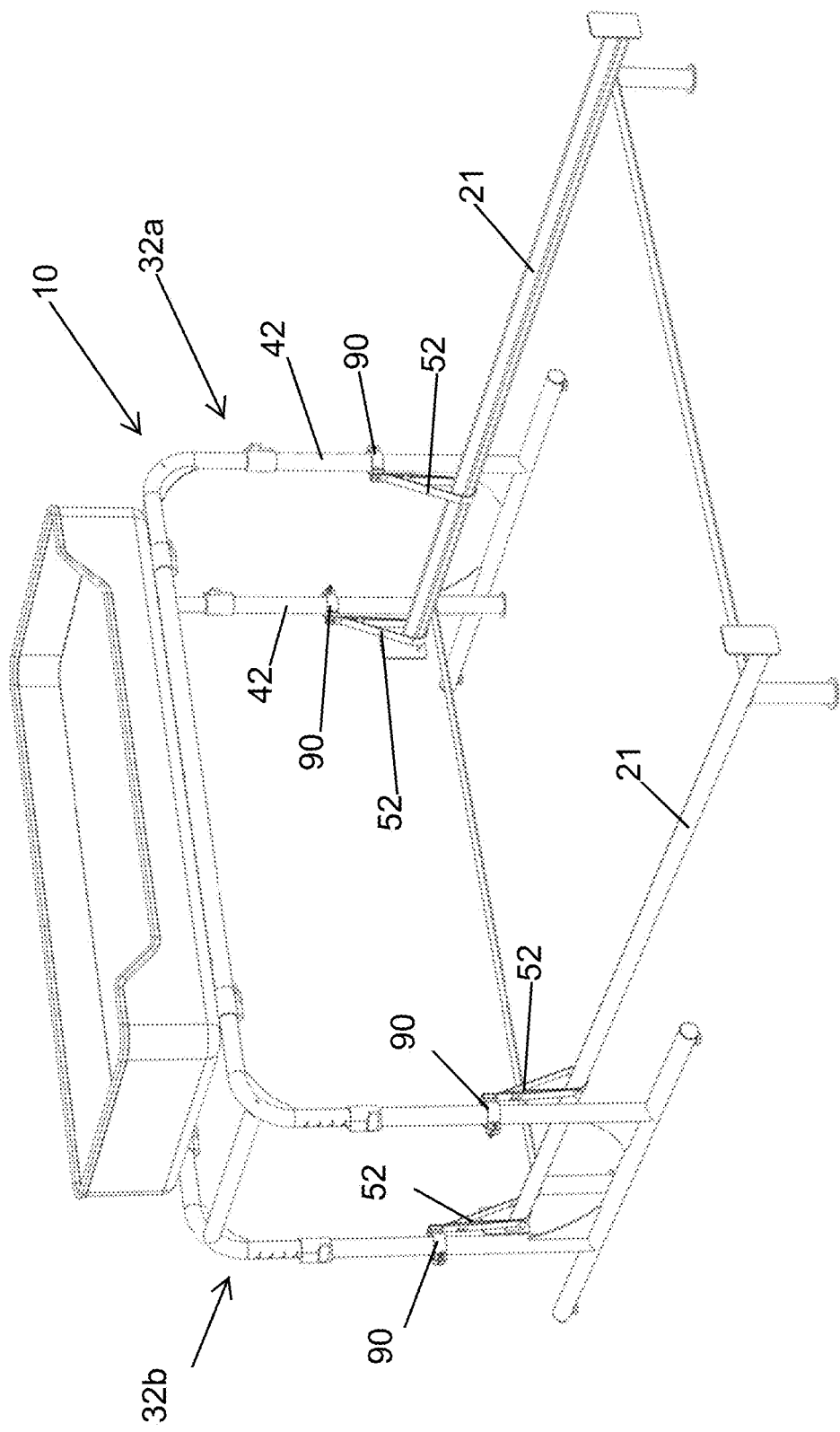
FIG. 5 illustrates another embodiment of a pet platform described herein.

Another embodiment of the pet platform 10 is illustrated in FIG. 5. In this embodiment, the pet platform 10 is substantially identical to the pet platform illustrated in FIGS. 1-4 and like elements are referenced using the same reference numerals. In FIG. 5, instead of having the spacer members 50 as in FIGS. 1-4, the vertical members 42 of the support legs 32a, 32b have adjustable collars 90 that are vertically adjustable in height on the vertical members 42. The collars 90 can have any configuration that allows them to be vertically adjusted in height along the length of the vertical members 42. For example, the collars 90 can be configured as clamps that can be loosened to permit vertical adjustment, and then tightened to lock the vertical position of the collars 90 along the vertical members 42. In another embodiment, the spacer members 50 of FIGS. 1-4 can still be provided, but made vertically adjustable up and down along the vertical members 42. Vertical adjustment of the collars 90 (or of the spacer members 50) permits vertical adjustment of the bed frame attachment members 52 which is useful to accommodate different heights and styles of bed frames and side rails.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A pet platform configured for use with a bed having a mattress supported on a bed frame, comprising:
   a support frame having first and second support legs, and a support member that extends horizontally between the first and second support legs;
   the first and second support legs each having a base end that in use rest on a floor on which the bed is supported, an upper end that in use is positioned above a surface of the mattress, an inner side that in use faces toward the bed, and an outer side that in use faces away from the bed;
   the base ends of the first and second support legs are spaced apart from one another by a distance of at least thirty-eight inches;
   the support member has opposite ends that are fixed to the upper ends of the first and second support legs whereby in use the support member is positioned above a surface of the mattress, the support member further includes a lower side that in use faces toward the surface of the mattress, and an upper side that in use faces away from the surface of the mattress;
   at least one bed frame attachment member secured to the first support leg, and at least one bed frame attachment member secured to the second support leg, the bed frame attachment members are each configured to releasably attach the first and second support legs, respectively, to the bed frame;
   the at least one bed frame attachment member of the first support leg has a first end fixed to the first support leg and a second end formed into a loop, and the first end is configured such that it is vertically adjustable along a height of the first support leg;
   the at least one bed frame attachment member of the second support leg has a third end fixed to the second support leg and a fourth end formed into a loop, and the third end is configured such that it is vertically adjustable along a height of the second support leg;
   each of bed frame attachment members are each positioned closer to the respective base ends of the first and second support legs than they are to the respective upper ends of the first and second support legs.

2. The pet platform of claim 1, wherein the first and second support legs are each configured to be adjustable in length to permit adjustment of a distance between the respective base end and the upper end.

3. The pet platform of claim 1, wherein the support member is configured to be adjustable in length to permit adjustment of a distance between the opposite ends thereof.

4. The pet platform of claim 1, comprising at least two of the bed frame attachment members secured to the first support leg, and at least two of the bed frame attachment members secured to the second support leg.

5. The pet platform of claim 1, further comprising first and second slip covers that are removably disposed over the first and second support legs, respectively.

6. The pet platform of claim 1, further comprising a bed insert disposed on the support member at the upper side thereof, the bed insert having a bottom wall and a plurality of upstanding walls extending from the bottom wall, the upstanding walls and the bottom wall defining an interior space, and a pad disposed within the interior space of the bed insert.

7. The pet platform of claim 1, wherein each of the at least one bed frame attachment members is vertically adjustable in height on the first support leg and the second support leg, respectively.

8. A system, comprising:
   a bed having a mattress supported on a bed frame, the bed having a head end and a foot end;
   the pet platform of claim 1 disposed at the foot end of the bed with the first and second support legs having the base ends thereof resting on the floor, and the support member extending laterally over a top surface of the mattress, and the bed frame attachment members are attached to the bed frame.

9. The system of claim 8, wherein the bed frame includes first and second side rails, and the bed frame attachment members are attached to the first and second side rails, and the bed frame attachment members are secured to the first and second support legs at a position that is higher than the first and second side rails.

10. A bed assembly configured to support a pet or child above a user's bed thereby preventing the pet or child from disturbing the user when sleeping, the bed assembly comprising:

a support frame having first and second support legs, and a support member that extends horizontally between the first and second support legs;

the first and second support legs each having a base end that in use rest on a floor on which the bed is supported, an upper end that in use is positioned above a surface of the bed, an inner side that in use faces toward the bed, and an outer side that in use faces away from the bed;

the base ends of the first and second support legs are spaced apart from one another by a distance of at least thirty-eight inches;

the support member has opposite ends that are fixed to the upper ends of the first and second support legs whereby in use the support member is positioned above a surface of the bed, the support member further includes a lower side that in use faces toward the surface of the bed, and an upper side that in use faces away from the surface of the bed;

at least one first bed frame attachment member secured to the first support leg, and at least one second bed frame attachment member secured to the second support leg, the at least one first bed frame attachment member and the at least one second bed frame attachment member are configured to releasably attach the first and second support legs, respectively, to a bed frame of the bed;

the at least one first bed frame attachment member of the first support leg has a first end fixed to the first support leg and a second end formed into a loop, and the first end is configured such that it is vertically adjustable along a height of the first support leg;

the at least one second bed frame attachment member of the second support leg has a third end fixed to the second support leg and a fourth end formed into a loop, and the third end is configured such that it is vertically adjustable along a height of the second support leg;

the at least one first bed frame attachment member and the at least one second bed frame attachment member are positioned closer to the respective base ends of the first and second support legs than they are to the respective upper ends of the first and second support legs.

11. The bed assembly of claim 10, wherein the first and second support legs are each configured to be adjustable in length to permit adjustment of a distance between the respective base end and the upper end.

12. The bed assembly of claim 10, wherein the support member is configured to be adjustable in length to permit adjustment of a distance between the opposite ends thereof.

13. The bed assembly of claim 10, comprising at least two of the first bed frame attachment members secured to the first support leg, and at least two of the second bed frame attachment members secured to the second support leg, each of the first bed frame attachment members and each of the second bed frame attachment members are configured to releasably attach the first and second support legs, respectively, to the bed frame.

14. The bed assembly of claim 10, further comprising first and second slip covers that are removably disposed over the first and second support legs, respectively.

15. The bed assembly of claim 10, further comprising a bed insert disposed on the support member at the upper side thereof, the bed insert having a bottom wall and a plurality of upstanding walls extending from the bottom wall, the upstanding walls and the bottom wall defining an interior space, and a pad disposed within the interior space of the bed insert.

16. The bed assembly of claim 10, wherein each of the at least one first bed frame attachment member and the at least one second bed frame attachment member are vertically adjustable in height on the first support leg and the second support leg, respectively.

17. A system, comprising:
a bed having a mattress supported on a bed frame, the bed having a head end and a foot end;
the bed assembly of claim 10 disposed at the foot end of the bed with the first and second support legs having the base ends thereof resting on the floor, and the support member extending laterally over a top surface of the mattress, and the at least one first bed frame attachment member and the at least one second bed frame attachment member are attached to the bed frame.

18. The system of claim 17, wherein the bed frame includes first and second side rails, and the at least one first bed frame attachment member is attached to the first side rail, the at least one second bed frame attachment member is attached to the second side rail, the at least one first bed frame attachment member and the at least one second bed frame attachment member are secured to the first and second support legs, respectively, at a position that is higher than the first and second side rails.

\* \* \* \* \*